US010446296B2

(12) United States Patent
Roggow

(10) Patent No.: US 10,446,296 B2
(45) Date of Patent: Oct. 15, 2019

(54) SURGE ARRESTER AND METHOD OF MANUFACTURING A SURGE ARRESTER

(71) Applicant: SIEMENS AKTIENGESELLSCHAFT, Munich (DE)

(72) Inventor: Henrik Roggow, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/923,661

(22) Filed: Mar. 16, 2018

(65) Prior Publication Data

US 2019/0057797 A1 Feb. 21, 2019

(30) Foreign Application Priority Data

Aug. 16, 2017 (DE) .................... 10 2017 214 287

(51) Int. Cl.
| | |
|---|---|
| *H01C 1/034* | (2006.01) |
| *C08J 5/04* | (2006.01) |
| *H01C 17/02* | (2006.01) |
| *H01C 7/12* | (2006.01) |
| *H01C 7/102* | (2006.01) |

(52) U.S. Cl.
CPC .............. *H01C 1/034* (2013.01); *C08J 5/043* (2013.01); *H01C 7/102* (2013.01); *H01C 7/12* (2013.01); *H01C 7/126* (2013.01); *H01C 17/02* (2013.01); *C08J 2300/00* (2013.01); *C08J 2300/24* (2013.01)

(58) Field of Classification Search
CPC .......... H01C 7/12; H01C 7/126; H01C 17/02; H01C 1/034; C08J 5/043
See application file for complete search history.

(56) References Cited

U.S. PATENT DOCUMENTS

| | | | | | |
|---|---|---|---|---|---|
| 3,993,726 | A | * | 11/1976 | Moyer | B29B 15/122 264/171.12 |
| 4,588,538 | A | * | 5/1986 | Chung | B29B 15/122 264/136 |
| 4,864,456 | A | * | 9/1989 | Thuillier | H01C 7/12 361/126 |

(Continued)

FOREIGN PATENT DOCUMENTS

| | | |
|---|---|---|
| CN | 101866731 A | 10/2010 |
| DE | 69311315 T2 | 12/1997 |

(Continued)

OTHER PUBLICATIONS

JB/T 6236-2015—"Resin Impregnated Glass Banding Tape for Electrical Insulation" Machinery Industry Standard of the People's Republic of China, issued on Apr. 30, 2015; ICS 29.035.99, K 15, Record No. 49854-2015.

*Primary Examiner* — Kyung S Lee
(74) *Attorney, Agent, or Firm* — Laurence Greenberg; Werner Stemer; Ralph Locher

(57) ABSTRACT

A surge arrester has a discharge column formed of a stack of a plurality of varistor disks. The stack is stabilized with a fiberglass material. The fiberglass material is preimpregnated with a resin and the fiberglass material has glass fibers with a maximum diameter of 8 μm. A surge arrester may be formed by wrapping a tape of such fiberglass material around a stack of varistor disks.

16 Claims, 2 Drawing Sheets

(56) References Cited

U.S. PATENT DOCUMENTS

| | | | | |
|---|---|---|---|---|
| 5,608,597 A | * | 3/1997 | Holmstrom | H01C 7/126 361/126 |
| 6,008,975 A | * | 12/1999 | Kester | H01C 7/12 361/111 |
| 6,185,813 B1 | * | 2/2001 | Donnola | H01C 7/12 29/613 |
| 7,015,786 B2 | * | 3/2006 | Ramarge | H01C 7/102 338/20 |

FOREIGN PATENT DOCUMENTS

| | | |
|---|---|---|
| DE | 69534541 T2 | 7/2006 |
| EP | 0628391 B1 | 6/1997 |
| EP | 1067565 A2 | 1/2001 |
| EP | 1436819 B1 | 4/2012 |

\* cited by examiner

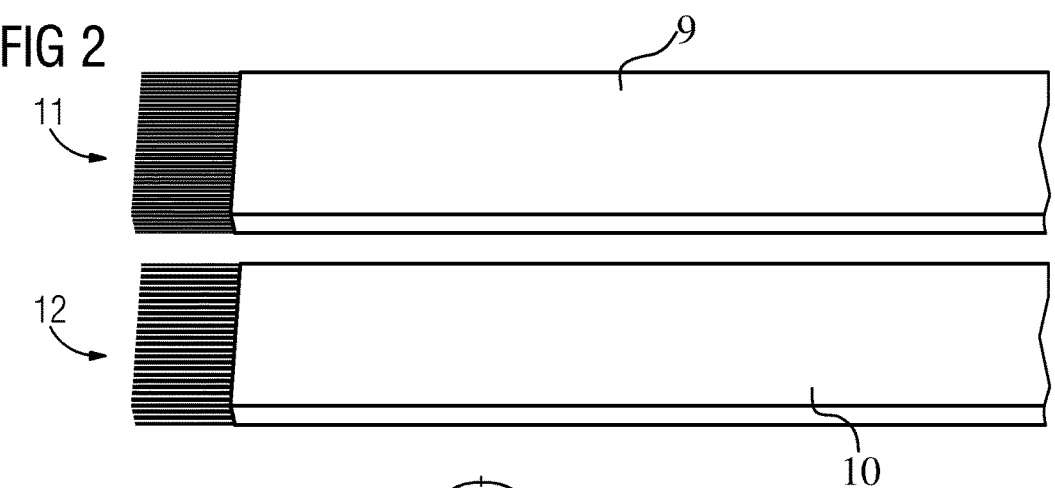
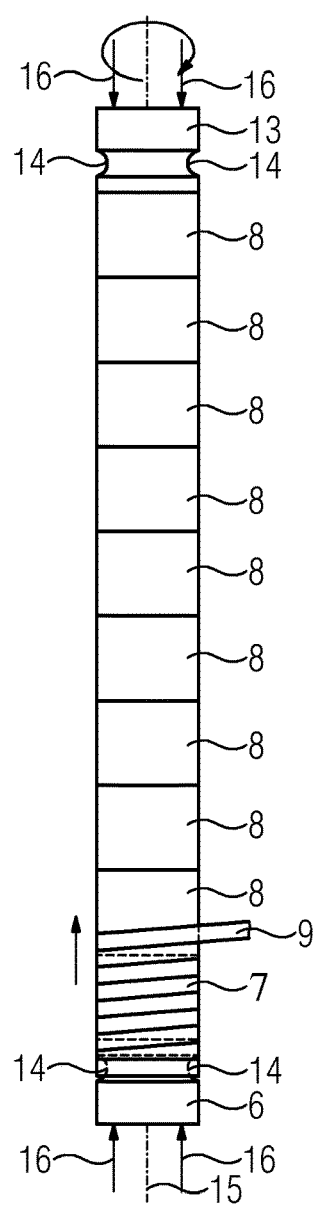

SURGE ARRESTER AND METHOD OF MANUFACTURING A SURGE ARRESTER

CROSS-REFERENCE TO RELATED APPLICATION

This application claims the priority, under 35 U.S.C. § 119, of German patent application DE 10 2017 214 287.1, filed Aug. 16, 2017; the prior application is herewith incorporated by reference in its entirety.

BACKGROUND OF THE INVENTION

Field of the Invention

The invention relates to a surge arrester of the type having a discharge column with a plurality of varistor disks. The discharge column is stabilized with a fiberglass material that is pre-impregnated with a resin. The invention also relates to a method of manufacturing a surge arrester.

Surge arresters are used in the mid-voltage and high-voltage range in order to dissipate surges, meaning voltages far above the nominal voltages provided during operation, safely to the ground. Damage to operating equipment such as transformers, for example, are avoided due to this. For example, a surge arrester for high voltage can be arranged on an overhead power line and dissipate impermissibly high levels of power to the ground in the case of a lightning strike or a short circuit. Surge arresters primarily have a housing and metal-oxide resistors, so-called varistors. Varistors are electrical resistors, the electrical resistance value of which is very high up to a design-related threshold voltage and is considerably reduced above the threshold voltage so that the surge arrester becomes a good electrical conductor. Metal-oxide resistors in disk form are arranged on top of each other and connected to the high-voltage potential and ground potential at the respective ends of the housing. Thereby, the surge arrester is scarcely conductive during normal operation, so that only a small amount of leakage power flows to the ground. In the case of a malfunction, however, a high leakage current flows.

The housing serves to protect the resistors against external influences and mechanical strain. A distinction is made between porcelain and polymer devices. Polymer housings are usually made of different materials. Stiffening elements inside provide for the necessary mechanical strength. Various versions of the stiffening elements are common: GFRP rods, GFRP pipes or resin-impregnated fiberglass tapes or matting (GFRP=glass-fiber reinforced plastic). They are then coated with another material, for example, silicone or ethylene propylene diene monomer (EPDM) in order to ensure protection against environmental factors.

A surge arrester according to this class is known from U.S. Pat. No. 7,015,786 B2 and its European counterpart patent EP 1 436 819 B1. The surge protector is intended for the midrange-voltage level and has a plurality of the varistor blocks, which are stacked on top of each other into a discharge column. The discharge columns are mechanically stabilized by wrapping them with a preimpregnated fiber material. The fiber material is designed as a fabric, meaning that individual fibers of the material intersect in an alternating manner. When the preimpregnated fiber material has hardened, a conventional housing made of silicone is applied with shields to extend a creepage path, for example, by means of a mold injection process.

Silicone is permeable to water vapor. During operation, this results in water vapor being able to diffuse into and out of the housing. Accumulated water can lead to partial discharges and/or a dissipation increase in the device. Both mechanisms reduce the lifetime of the device and lead to premature failure. Preventing moisture from penetrating into the devices, the mechanical strength of which is established by means of resin-impregnated fiberglass tapes or matting, is particularly critical.

This design is also referred to as a "wrap." In a first manufacturing step, the tape or the matting is wrapped around the columns of the metal-oxide resistors. Then, the wrapped active part is hardened for a defined period of time and at a defined temperature (manufacturer specifications for specific tape, for example, 3 h at 150° C.). By means of this, the required strength is achieved. In conclusion, the cured active part is poured and encapsulated with silicone.

SUMMARY OF THE INVENTION

It is accordingly an object of the invention to provide a surge arrester device and a method of manufacturing a surge arrester which overcome the above-mentioned and other disadvantages of the heretofore-known devices and methods of this general type and which provides for a surge arrester that can be manufactured to be particularly weatherproof, long-lasting and yet inexpensive.

With the foregoing and other objects in view there is provided, in accordance with the invention, a surge arrester, comprising:

a discharge column formed with a plurality of varistor disks; and fiberglass material impregnated with resin disposed to stabilize the discharge column, the fiberglass material having glass fibers with a maximum diameter of 8 μm.

Surprisingly, it is been shown that, when using glass fibers with a maximum diameter of 8 μm, a particularly weatherproof and long-lasting surge arrester can be constructed. The problem of the accumulation of water within the housing of the surge arresters with a wrapped active part can be prevented by means of reducing the diameter of the individual glass fibers. Tests have shown that a diameter of 8 μm or less is required. Thereby, it is irrelevant if the fibers in the tape run unidirectionally or if they are interwoven.

During the production of the tape, initially, individual glass fibers (for example, four pieces respectively) are twisted into bundles. The smaller the diameter of the fibers are, the more the fibers can be twisted and the smaller the remaining cavities are. Following this, these bundles are used to produce the tape.

Thereby, the comparably thinner fibers according to the invention have the effect that the cavities between the fibers no longer represent surfaces which are apt for water to penetrate. Thereby, it is taken advantage of that the thinner fibers twist better and cavities are avoided or kept small. By means of this, processing is easier and less expensive since the winding and hardening of the tape can be take place by means of the ambient air.

A possible alternative solution is the hardening of the tape under a vacuum, whereby the air is removed from the tape. However, this has the serious disadvantage that the manufacturing process becomes more complicated and considerably more expensive.

It is especially preferred if the fiberglass material has glass fibers with a diameter of a maximum of 7 μm. This causes a further improved durability of the arrester.

In another preferred embodiment of the surge arrester according to the invention, the surge arrester is designed for middle-voltage applications. This is an advantage because, particularly in the case of medium-voltage surge arresters, there is a particularly high level of cost pressure on manufacturers because customers purchase in a very price-conscious manner. For this reason, the surge arrester according to the invention can be particularly well applied in the case of midrange voltage, because it is durable and, furthermore, inexpensive to manufacture because the expensive and elaborate work step of vacuuming to remove air bubbles is done without, thereby incurring savings.

In another preferred embodiment of the surge arrester according to the invention, the fiberglass material has a resin content of more than 21 percent by weight. This is an advantage because tests have shown that such fiberglass material in conjunction with thin glass fibers according to the invention are very resistant to moisture. A high resin content means a stable hardening and also sealing of cavities. A higher resin content furthermore reduces the air contained in the hardened tape. A resin content of more than 21 percent by weight can, for example, be set according to the Chinese standard JB/T 6236-2015, for example for a fiberglass material of the type "2845-W." Thereby, it has to do with a tape, where the glass fibers run unidirectionally in the longitudinal direction.

In another preferred embodiment of the surge arrester according to the invention, the fiberglass material has a percentage of volatile substances within the resin of less than 4 percent by weight. This is an advantage because tests have shown that such fiberglass material in conjunction with thin glass fibers according to the invention are very resistant to moisture. Volatile substances are substances that evaporate either already at room temperature or when heating the fiberglass material to harden the resin. This causes gas inclusions in the hardened fiberglass material that must absolutely be avoided or considerably reduced in order to achieve good weather resistance. A percentage of volatile substances within the resin of less than 4 percent by weight can, for example, be set according to the Chinese standard, JB/T 6236-2015, for example for a fiberglass material of the type "2845-W".

In another preferred embodiment of the surge arrester according to the invention, the fiberglass material is applied by wrapping the discharge column. This is an advantage because this makes simple and inexpensive manufacturing of the surge arrester possible.

In another preferred embodiment of the surge arrester according to the invention, the fiberglass material is formed as a tape, which has a narrower width than the length of the discharge column. This is an advantage because this makes simple and inexpensive manufacturing of the surge arrester possible. Such a tape can be easily applied to the discharge column manually by a worker or a corresponding wrapping machine.

In another preferred embodiment of the surge arrester according to the invention, the tape is wrapped around the discharge column several times. This is an advantage because a particularly thick layer forms around the discharge column.

In another preferred embodiment of the surge arrester according to the invention, a housing made of a material is provided, which is at least partly composed of silicone. This is an advantage because silicone is a low-cost and long-proven housing material.

Furthermore, using the known manufacturing processes for surge arresters as a basis, the inventor faces the task of indicating a manufacturing method for a surge arrester that makes comparably inexpensive manufacturing of a particularly weatherproof and long-lasting surge arrester possible.

With the above and other objects in view there is also provided, in accordance with the invention, a method of manufacturing a surge arrester, the method comprising the following steps:

providing a fiberglass material impregnated with resin, the fiberglass material having glass fibers with a maximum diameter of 8 µm; and stabilizing a discharge column having a plurality of varistor disks with the fiberglass material.

The novel method provides for the same benefits as explained above.

Other features which are considered as characteristic for the invention are set forth in the appended claims.

Although the invention is illustrated and described herein as embodied in a surge arrester and manufacturing process for a surge arrester, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 shows two different fiberglass materials; and

FIG. 3 illustrates an intermediate step in manufacturing a surge arrester.

DETAILED DESCRIPTION OF THE INVENTION

Figure 1:
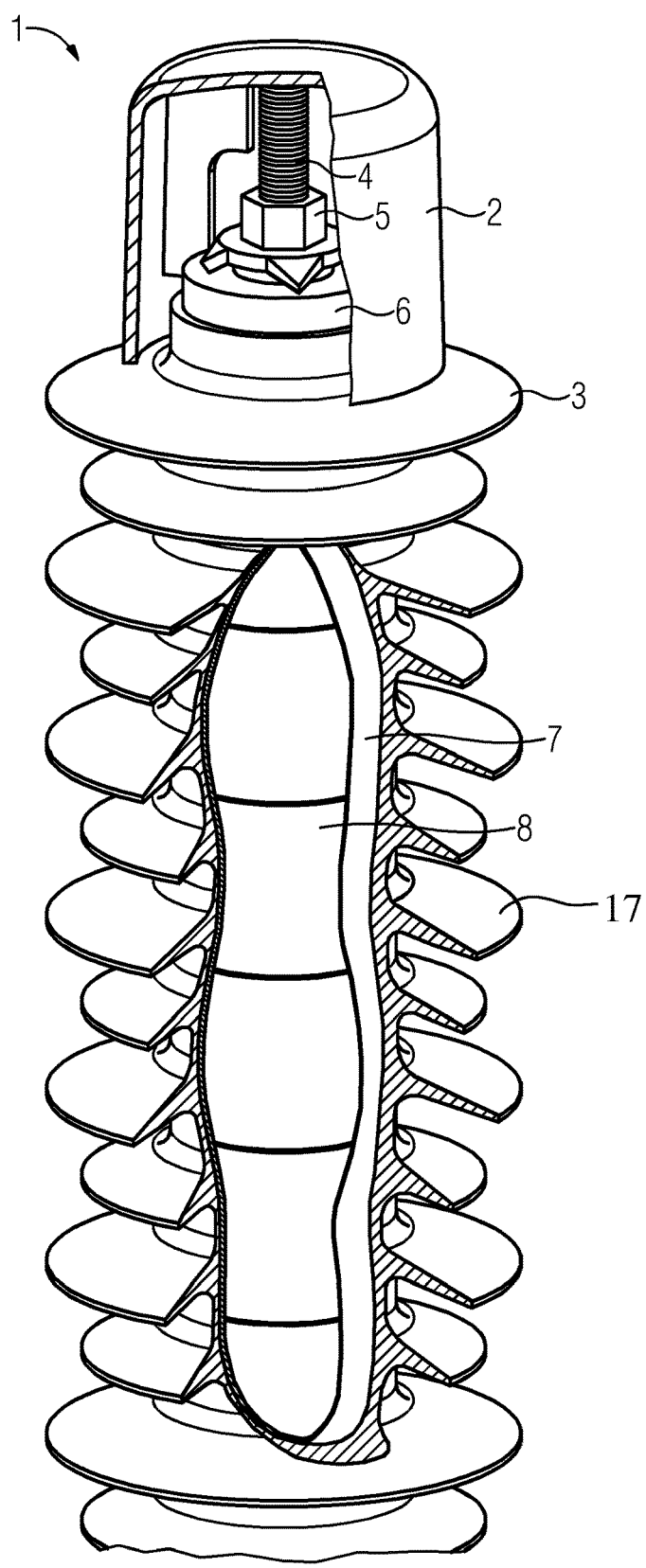
FIG. 1 partly broken-away view of a surge arrester according to the invention.

Referring now to the figures of the drawing in detail and first, particularly, to FIG. 1 thereof, there is shown a partly sectional view of a surge arrester 1 according to the invention. The surge arrester 1 has a silicone housing 2. The housing 2 has a protective shield 3. In the interior space of the housing 2, there is a discharge column, comprising a plurality of varistor disks 8 stacked on top of each other. A respective end fitting 6 is at the top and bottom end of the discharge column. A threaded bolt 4 on the end fitting 6 is set by means of a nut 5.

The discharge column with varistor disks 8 is wrapped with a fiberglass material 7, which has glass fibers with a maximum diameter of 8 µm. The fiberglass material 7 has a hardened resin so that the fiberglass material 7 mechanically stabilizes the discharge column with varistor disks 8 and furthermore considerably prevents the penetration of water through the housing 2 to the varistor disks 8.

The fiberglass material 7 is particularly impervious to water, because it has a resin content of more than 21 percent by weight. This effect is even further improved by the resin used having less than 4 percent of volatile substances by weight.

FIG. 2 shows two different types of fiberglass materials 9, 10. The fiberglass material 9 has a fiber diameter of 7 µm. Fiber optic material 10 has a fiber diameter of 9 µm. At the ends 11 and 12, it is clearly recognizable that the fiber material 9 with the comparably smaller fiber diameter of 7 µm has a considerably finer fiber structure. This finer fiber structure is achieved due to a better twisting of the individual glass fibers into the illustrated tape material 9.

FIG. 3 shows an intermediate step in manufacturing a surge arrester according to the invention. A plurality of varistor disks 8 are stacked on top of each other so that a discharge column is formed. At the ends of the discharge column, there is an end fitting 6, 13 provided respectively. The end fittings are pressed together by pressure in the direction of the arrows 16. By means of this, a stability of the discharge column required for further processing for wrapping with the fiberglass material 9 in tape form is provided. The end fittings 6, 13 each have a ring-shaped indentation 14. The ring-shaped indentation 14 makes it possible to wrap the fiberglass material tape 9 firmly around the end fitting and then to wrap the entire length of the discharge column with the tape 9 in a slightly angled manner. An intermediate step is shown, where approximately a fourth of the length of the discharge column has already been wrapped with tape 9 from left to right.

The wrapping takes place by rotating the discharge column with the end fixtures 6, 13 around the axis 15 in a clockwise direction. If a complete layer of tape 9 has been formed around the discharge column by rotating and evenly wrapping it, the tape 9 reaches the indentations 14 of the end fitting 13 on the right side. Here, in contrast, the tape can be tightly wrapped up so that it ends up in the indentation 14. Then, in turn, the tape 9 can be wrapped around the axis 15 in the opposing direction, meaning the direction of the end fittings 6, at a slight angle by rotating the discharge column with the end fittings 6, 13. The angled winding in the other direction now ends up in the indentation 14 of the end fitting 6 again. By wrapping with the tape at an angle to the right on the one hand, and to the left on the other, an especially high level of mechanical stability is achieved. Depending on the desired thickness and mechanical stability of the fiberglass layer 7, another or a plurality of other wraps can also be carried out. In this case, for example, a wrap at an angle to the right, a wrap at an angle to the left, a wrap at an angle to the right and, again, a wrap at an angle to the left of the fiberglass band 9 end up occurring in an alternating sequence on the discharge column.

The tube with the reinforced discharge column may then be inserted into a housing. As illustrated in FIG. 1, a plurality of sheds 17, such as silicone rubber sheds, may subsequently be molded directly onto the tape-wrapped tube.

The invention claimed is:

1. A surge arrester, comprising:
   a discharge column formed with a plurality of varistor disks;
   fiberglass material impregnated with resin disposed to stabilize said discharge column;
   said fiberglass material having glass fibers with a maximum diameter of 8 μm twisted into bundles.

2. The surge arrester according to claim 1, wherein said fiberglass material has a resin content of more than 21 percent by weight.

3. The surge arrester according to claim 1, wherein said fiberglass material includes volatile substances, and a percentage of said volatile substances within said resin is less than 4 percent by weight.

4. The surge arrester according to claim 1, wherein said fiberglass material is wrapped around said discharge column.

5. The surge arrester according to claim 4, wherein said fiberglass material is a tape having a width that is narrower than a length of said discharge column.

6. The surge arrester according to claim 5, wherein said tape is wrapped around said discharge column a plurality of times.

7. The surge arrester according to claim 1, which further comprises a housing made of a material that is partly composed of silicone.

8. A method of manufacturing a surge arrester, the method comprising the following steps:
   providing a fiberglass material impregnated with resin, the fiberglass material having glass fibers with a maximum diameter of 8 μm twisted into bundles; and
   stabilizing a discharge column having a plurality of varistor disks with the fiberglass material.

9. The method according to claim 8, which comprises providing the fiberglass material with a resin content of more than 21 percent by weight.

10. The method according to claim 8, which comprises providing the fiberglass material with a resin having volatile substances, and wherein a percentage of the volatile substances in the resin is less than 4 percent by weight.

11. The method according to claim 8, which comprises wrapping the fiberglass material around the discharge column.

12. The method according to claim 11, wherein the fiberglass material is a tape having a width that is narrower than a length of the discharge column.

13. The method according to claim 11, which comprises wrapping a tape around the discharge column a plurality of times.

14. The method according to claim 8, which comprises providing a housing of a material made, at least in part, of silicone.

15. The method according to claim 8, which comprises configuring the surge arrester for midrange-voltage applications.

16. A surge arrester, comprising:
   a discharge column formed with a plurality of varistor disks;
   fiberglass material impregnated with resin disposed to stabilize said discharge column;
   said fiberglass material having glass fibers with a maximum diameter of 8 μm and said fiberglass material having a resin content of more than 21 percent by weight.

* * * * *